United States Patent [19]
Mehltretter

[11] 3,824,592
[45] July 16, 1974

[54] METHOD AND APPARATUS FOR MEASURING AND INDICATING THE DISTANCE, DISTANCE VARIATION, OR BOTH BETWEEN AN AUTOMOTIVE VEHICLE AND AN OBSTACLE

[75] Inventor: Ludwig Mehltretter, Munich, Germany

[73] Assignee: Messerschmitt-Bolkow-Blohm Gesellschaft Mit Beschrankter Haftung, Munchen, Germany

[22] Filed: Oct. 10, 1972

[21] Appl. No.: 296,043

[30] Foreign Application Priority Data
Nov. 26, 1971 Germany.......................... 2158793

[52] U.S. Cl. ............ 343/13 R, 343/7 ED, 343/14, 343/17.1 PF
[51] Int. Cl. ........................ G01s 9/06, G01s 9/24
[58] Field of Search .................. 343/7 ED, 13 R, 14

[56] References Cited
UNITED STATES PATENTS

| | | | |
|---|---|---|---|
| 3,109,172 | 10/1963 | Hardinger et al...................... | 343/14 |
| 3,337,866 | 8/1967 | Gisonno .......................... | 343/7 ED |
| 3,474,444 | 10/1969 | Okamoto.......................... | 343/7 ED |
| 3,657,738 | 4/1972 | Carpentier et al................ | 343/14 X |
| 3,680,085 | 7/1972 | Del Signore .......................... | 343/14 |
| 3,757,329 | 9/1973 | Sato et al. .................... | 343/7 ED X |

Primary Examiner—T. H. Tubbesing
Attorney, Agent, or Firm—McGlew and Tuttle

[57] ABSTRACT

A modulated interrogation signal is transmitted from the vehicle, received at the vehicle after reflection from an obstacle, and compared with a reference signal for determination of the distance, distance variation or both. The transmission of the interrogation signal is stochastically controlled, and the received signals are utilized, to indicate the desired distance information, only after repeated comparison correlation thereof with the reference signal. The apparatus includes a transmitter controlled by a function generator to emit a modulated interrogation signal, a receiver for the reflected interrogation signal, an evaluating circuit for comparing the reflected signal with the reference signal, and an indicating instrument influenced by the evaluation circuit. The generator stochastically controls either the frequency or the amplitude of the function generator within certain limits, and a plurality of distance gates in the evaluation circuit, corresponding to respective successive distance ranges, have the reference signal applied to a first input and the received signals applied to a second input. Each gate has a correlator connected to its output and which is operable, only after repeated gating through of the associated distance gate, to deliver a signal to the indicating instrument connected with the respective distance gate.

12 Claims, 7 Drawing Figures

METHOD AND APPARATUS FOR MEASURING AND INDICATING THE DISTANCE, DISTANCE VARIATION, OR BOTH BETWEEN AN AUTOMOTIVE VEHICLE AND AN OBSTACLE

FIELD AND BACKGROUND OF THE INVENTION

This invention relates to a method and apparatus for measuring and indicating the distance, distance variation, or both between a motor vehicle and an obstacle, and wherein a modulated interrogating signal is emitted or transmitted from the motor vehicle, received at the vehicle after reflection from an obstacle, and compared with a reference signal for the determination and indication of the distance, distance variation or both.

Such devices, in motor vehicles, are planned for use preferably on roadway stretches having only small curves, for example on thruways, expressways, and the like. The purpose is to warn the driver of an automotive vehicle, primarily when visibility is poor, as for example in fog, in a snowstorm, or in the dark, against too small a distance from an obstacle, such as a preceding vehicle or an abandoned vehicle, to cause the driver to change his mode of driving in time to avoid a collision. In such devices, therefore, a transmitter for electromagnetic waves, generally a radar transmitter, must be provided, with which at least the distance between the vehicle and the obstacle can be measured.

Thus, it is known, for example from German DOS No. 1,555,781, that the transmitter sends, at certain equal intervals of time, a short interrogation pulse over a directional antenna. From the time difference between the transmitted and reflected interrogation pulse, the distance between the vehicle and the obstacle is then determined in an evaluating circuit, or the distance variation can be determined by subsequent differentiation.

Alternatively, the distance variation can be determined from the Doppler frequency shift of the reflected interrogation pulses. However, this presupposes a complicated evaluating procedure, which is too expensive for the particular case here concerned, namely, use in automotive vehicles.

Known Doppler radar units, operating at a constant transmission frequency, for example, as shown in German DOS No. 1,917,606, are relatively inexpensive, but they determine only the distance variation without measuring the distance. Moreover, in these and similar Doppler radar units, for example, in frequency-modulated radar units, the transmitter and receiver must be well separated from each other so that, as a rule, two separate antennas are necessary. In addition, with these methods, evaluation is problematical, especially when the interrogation signals are reflected from a relatively large numer of obstacles, for example, preceding and approaching automotive vehicles, or when, for example, also on the opposite roadway there is a relatively large number of automotive vehicles emitting interrogation signals.

In all known devices for measuring the distance, considerable interference must still be expected, even on highway stretches with only small curves and for a desired range or measuring range up to about 100 to 150 m., this interference originating mainly from approaching automotive vehicles. The explanation for this is, among other things, the fact that, for an emitted or transmitted and again received interrogation signal, the sensitivity of the receiver decreases with the fourth power of the distance between the vehicle and the obstacle, such as a preceding vehicle, so that a high ratio of transmitting power to receiving power results. In the case of interference signals received directly from active interferers, such as approaching vehicles, the sensitivity of the receiver decreases only with the square of the distance, however, so that these interferences become operative already from much greater distances than the actual range or the measuring range of the device for measuring the distance.

SUMMARY OF THE INVENTION

The objective of the invention is to improve methods and apparatus for measuring and indicating the distance, distance variation, or both between an automotive vehicle and an obstacle in such a manner that possible interferences from other automotive vehicles or other interferers are suppressed.

In accordance with the invention, this problem is solved in that the modulated interrogation signal is emitted or transmitted stochastically controlled, and that the received signals are used, for indication of the distance, distance variation, or both only after repeated comparison or correlation with the reference signal.

The invention thus makes use of a point of information which is already known, in similar form, from the TACAN distance measuring system, namely, that the distance of the automotive vehicle from the obstacle changes relatively little from interrogation to interrogation as long as the interrogation frequency is sufficiently high. By correlation of the transmitted interrogation signals with the received signals, which may also contain interference signals, for example, in a correlator, the interrogation signals reflected from the obstacle can be distinguished clearly from other interference signals when there is no synchronism between the reflected interrogation signals and the interference signals. This is achieved by the stochastic control of the interrogation signals, whereby the received interference signals continuously have a different coordination with the reflected interrogation signals, which, after the correlation of several received signals with the transmitted interrogation signals or, respectively, with the derived reference signals, is no longer taken into account.

Assuming that, from each automotive vehicle, the distance from obstacles is measured by the method of the invention and the range from interferences from approaching vehicles is assumed to be 1 kilometer, there must be taken into account about 100 interfering vehicles per lane, that is, with about 200 interferers in the most unfavorable case of a dense column of vehicles with a vehicle spacing of about 10 meters. In practice, this number should be considerably lower as some vehicles shield one another. On the basis of experience with the known TACAN distance measuring system, even this many interferences can be separated from each other and evaluated perfectly without difficulty.

Apparatus for performing the method of the invention for measuring and indicating the distance, distance variation, or both between an automotive vehicle and an obstacle can be attained with a circuit having the following elements: A transmitter which, controlled by a function generator, emits or transmits a modulated interrogation signal; a receiver for the interrogation signal reflected from the obstacle; an evaluating circuit for comparison of the received interrogation signal with a reference signal; and an indicating instrument influenced by the evaluation circuit and indicating the desired distance information as determined from the comparison.

In addition, a generator is provided which stochastically controls the frequency, amplitude, or both of the function generator within certain limits, as well as a plurality of distance gates in the evaluation circuit and corresponding to respective distance ranges. Each distance gate has the reference signal gated to one input and the received signals gated to the other input, and a respective correlator is correlated with each distance gate. The correlators are operable, only after repeated gating through of the associated distance gate, to deliver a signal to the indicating instrument connected with the respective distance gate.

In principle, the method and apparatus of the invention can be used in connection with all possible radar systems, thus, for example, also with a frequency-modulated radar system, where the frequency modulation occurs stochastically, for example with noise or the like, and the receiver is caused to follow in the same manner.

A particularly simple construction design can be attained, however, with a pulse radar method. In this case, the function generator is designed as a pulse generator which, with a pulse repeat frequency varying stochastically within certain limits, pulse-modulates the transmitting oscillator and, with every pulse, starts a counter clocked at a constant frequency, with this counter, in turn, delivering successive clock pulses to AND gates and corresponding to first inputs of successive distance ranges. The received signals are gated to the second inputs, and the outputs of the AND gates are correlated by integrating members with a time constant which corresponds to a time span between several emitted or transmitted interrogation signals.

Due to the rating of the time constant of the integrating member, the same distance gate, here designed as an AND gate, must initially be actuated several times, for example five times, before a signal is passed on to the indicating device. If, for example in a pulse radar method, an interrogation pulse is emitted every thousandth of a second, the distance between two automotive vehicles moving toward each other at a relative speed of 100 km/h will change, during five transmissions of the interrogation signals, by only 27.5 cm, that is, remain in the same distance range which, depending on the speed of the vehicle, is selected at up to about 10 meters.

The time constant of the integrating member also prevents brief interferences at the indicating instrument from being taken into account. However, the interrogation signals emitted or transmitted from approaching automotive vehicles are also fed, by the stochastic emission of the pulse interrogation signals and the evaluation coupled therewith, into a different distance gate, so that the indicating instrument does not react.

Another form of construction of a distance alerting device, also of simple circuitry, can be attained with a radar system with frequency modulation. In accordance with the invention, the frequency delivered by the transmitting oscillator in this case is controlled by the function generator in a steadily rising and/or falling function, for example a triangle or trapeze function, modulated with a frequency variation which is high relative to the Doppler frequency shift occurring at the possible relative velocities between the vehicle and the obstacle. The breakoff or reversal points of the modulation function are controlled by the stochastic generator. In addition, there is provided a mixer for the determination of the difference frequency between the emitted or transmitted and the received signals, and this mixer clocks a digital counter whose outputs are connected with the inputs of respective AND gates. A pulse generator with a constant time base clears the counter at certain intervals and sends a reference signal to all the second inputs of the AND gates after the expiration of the time. In this case also, a respective integrating member is coordinated with a time constant which comprises several times the time base of the pulse generator.

In this frequency-modulated radar system, and to simplify the evaluation, a simple function is selected for modulation. Additionally, the frequency variation is selected to be so great that Doppler frequency shifts occurring due to distance variations can be neglected. In this case also, the distance variations are made visible to the driver directly on the indicating instrument.

The indicating instrument itself may be, as is known per se, equipped with optical, accoustic, or both devices to warn the driver. A particularly suitable indicating instrument for use with the described devices is that disclosed in German Offenlegungsschrift No. 2,158,788 and which consists of a series of signal lamps reproducing the road in front of the automotive vehicle, and which are electrically connected with a distance gate and are arranged in the driver's field of vision.

An object of the invention is to provide an improved method for measuring and indicating the distance, distance variation, or both between an automotive vehicle and an obstacle.

A further object of the invention is to provide such a method in which possible interferences from other automotive vehicles or other interferences are suppressed.

A further object of the invention is to provide an improved apparatus for performing the method.

Another object of the invention is to provide such a method and apparatus in which a modulated interrogation signal is emitted or transmitted stochastically controlled.

A further object of the invention is to provide such a method and apparatus in which the received signals are used for indication of the desired distance information only after repeated comparison or correlation with a reference signals.

For an understanding of the principles of the invention, reference is made to the following description of typical embodiments thereof as illustrated in the accompanying drawings.

DESCRIPTION OF THE PREFERRED EMBODIMENTS

Figure 1:
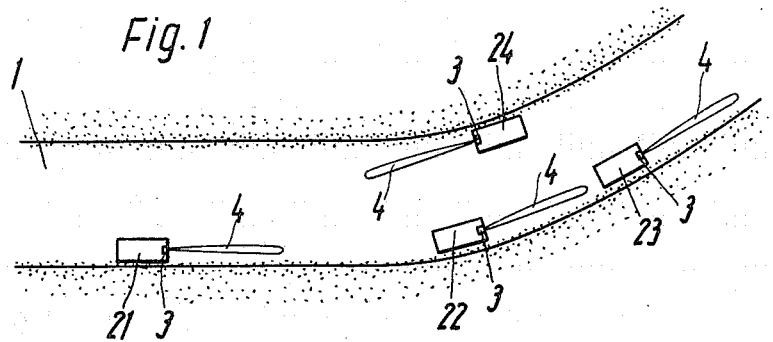
FIG. 1 is a schematic plan view of a road on which several automotive vehicles are running, and are equipped with devices for measuring and indicating the distance between a motor vehicle and an obstacle, these devices embodying the invention.
Figure 2:
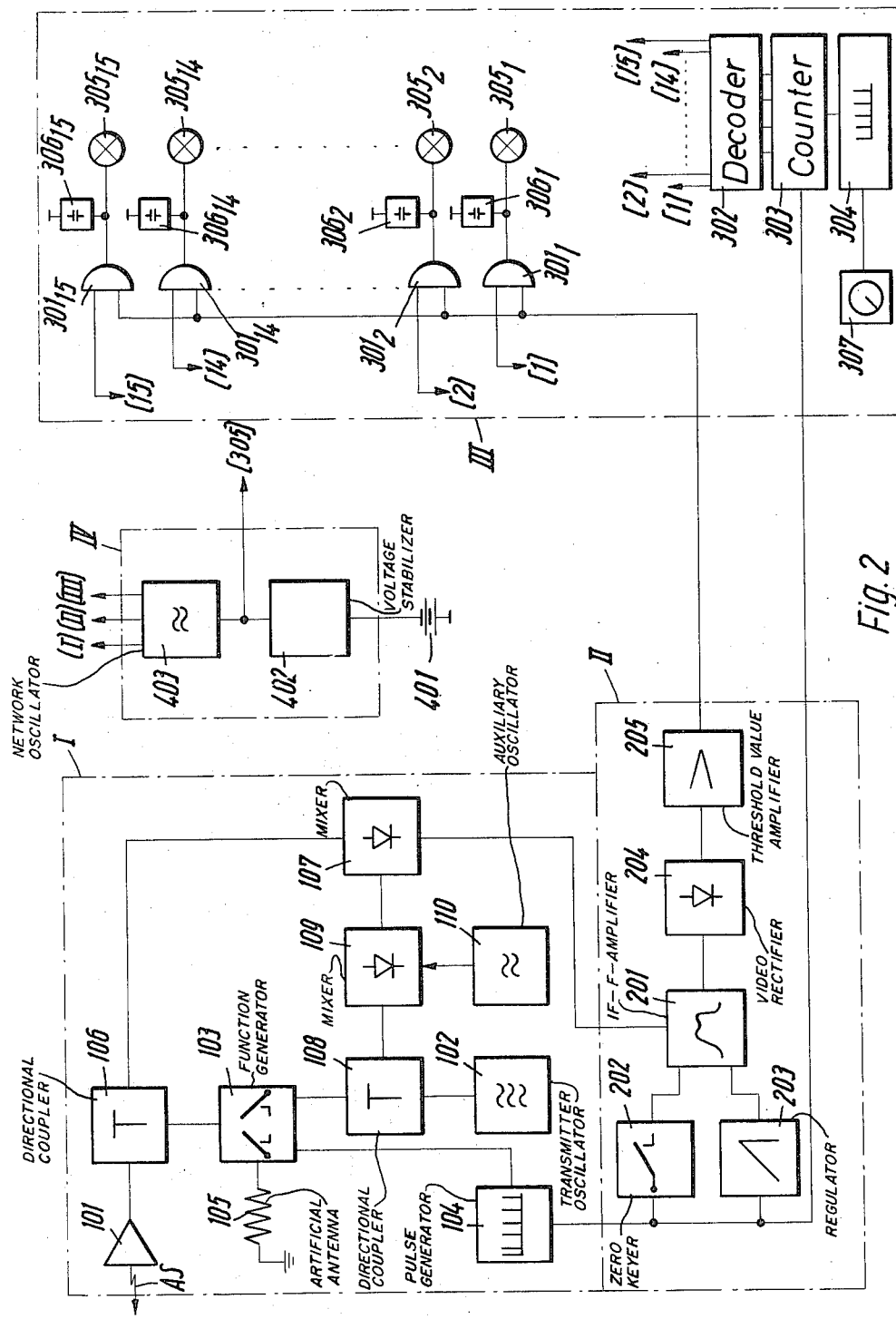
FIG. 2 is a block diagram of one embodiment of apparatus in accordance with the invention.

Referring to FIG. 1 of the drawing, automotive vehicles 21 – 24 running on a road 1 are equipped with devices 3 for measuring and indicating the distance between themselves and an obstacle, such as a preceding or an abandoned or stalled automotive vehicle. Through an antenna 101, as shown in FIG. 2, for example, a narrow radar lobe 4 is transmitted in the direction of travel of the respective motor vehicles 21 – 24. Radar lobe 4 may have, for example, an aperture angle of 3.5° which, at a range of about 100 meters, corresponds to an illumination of about 6 meters in with, which is approximately the width of one lane. For an aperture angle of the radar lobe of 3.5°, a gain of 30 db is required for transmission and for receiving. The antenna area necessary for this depends on the frequency and is, assuming an antenna coverage of 50 percent, for a frequency of about 10 GHz, 1,440 cm$^2$, corresponding to an antenna diameter of 43 cm. For a frequency of 26 GHz, an antenna area of 211 cm$^2$, corresponding to a diameter of 16.5 cm of the antenna, is necessary. In the latter case, the antenna would have, for example, the dimensions of a headlamp. For these frequencies, sturdy and cheap transmitter diodes with a sufficient output power are already available.

As best seen in FIG. 2, the device 3 comprises four component groups or modules, namely, the transmit/receive module I, the IF module II, the indicator module III, and the power supply module IV. For design reasons, transmit/receive module I is combined with antenna 101, while the other modules II – IV can be accommodated in a housing of small dimensions, for example in the vicinity of the dashboard of the vehicle.

In transmit/receive module I, a transmitter oscillator, such as a transmitter diode 102, is provided, and this oscillates in the K band and, in so doing, delivers a frequency between 18 to 26 GHz, for example, with a transmission power of about 25 – 30 mW. During a short period of time, which is of the order of nano seconds, a function generator, in this case an electronic two-way switch 103, is so switched, by a generator 104, that transmitter diode 102 is connected with antenna 101 and the antenna emits a pulse type interrogation signal AS. After the interrogation pulse has decayed, electronic switch 103 gates the oscillator signal of transmitter diode 102 to a load, a so-called artificial antenna 105, whereby, at the same time, the antenna 101 is cleared for receiving.

The received signal which, accordingly, may be a reflected interrogation signal or an interference signal originating, for example, for another automotive vehicle, passes from antenna 101 through a directional coupler 106 which, during the transmission phase, prevents a coupling of the transmitting power on the receiver section of the transmit/receive module I, to a mixing stage 107. Through another directional coupler 108, with an attenuation of about 20 db, a small portion of the oscillator signal of transmitter diode 102 is sent to a second mixing stage 109 which, together with an auxiliary oscillator 110 oscillating, for example, in the 30 MHz range, replaces a normal receiver oscillator. In mixer stage 107, the received signals and the auxiliary signal from mixer 109 are superimposed to obtain an intermediate frequency (IF).

As the generator 104, there is selected a stochastic generator which continuously switches switch 103 of transmit/receive module I as a function, within certain accident-determined limits, of the generator pulses in such a way that the time span T between two successive emitted or transmitted interrogation pulses varies each time. For example, note FIG. 3 in which three such time spans $T_1$, $T_2$, and $T_3$ are shown.

The output signals of mixer 107 are amplified in an IF frequency amplifier 201 whose gain factor is regulated down to zero during the transmission phase through a zero keying device 202 controlled by stochastic generator 104. During the receiving phase, the gain factor of IF amplifier 201 is raised, for example linearly with a ramp function, by a regulator 203 and as a function of time. Accordingly, the interrogation pulses reflected from an obstacle close to the automotive vehicle are amplified only weakly, but those reflected from a distant obstacle are amplified strongly. In this manner, it is possible to attain that the reflected interrogation signals received from all areas within the measurement range are raised, in the amplifier 201, to about equal intensity.

The output signal of IF amplifier 201 is rectified in a video rectifier 204 and then sent to a threshold value amplifier 205 which serves to suppress the noise component in the received signals.

Output signals of threshold value amplifier 205 are supplied to a first input of several, in this case 15, distance gates preferably designed as AND gates $301_1 - 301_{15}$. Each second input of the AND gates is connected with the respective outputs of a decoder 302, with the coordination being indicated, in FIG. 2, by the bracketed numbers 1 – 15. Decoder 302 has connected therewith a four-bit counter 303 whose clock frequency is determined by a generator 304. To the outputs of the various AND gates 301 there are connected respective signal lamps $305_1$ to $305_{15}$, for example small gallium-arsenide diodes, as well as respective integrating members $306_1 - 306_{15}$, whose time constant is so selected that it corresponds to a time span between several emitted interrogation signals.

The circuit shown in FIG. 2 operates in a mode which will now be described. As soon as an interrogation signal AS triggered by a pulse of the stochastic generator 104 is emitted over antenna 101, counter 303 is started and distributes, through decoder 302, clock pulses successively to the various AND gates $301_1$ to $301_{15}$. As soon as the interrogation signal RS reflected from an obstacle, or an interference signal S, is supplied from the output of threshold value amplifier 205 to all first inputs of AND gates $301_1 - 301_{15}$m precisely that AND gate 301 to which, at the time considered, a clock pulse supplied by decoder 302 is applied, is switched through or opens.

Figure 3:
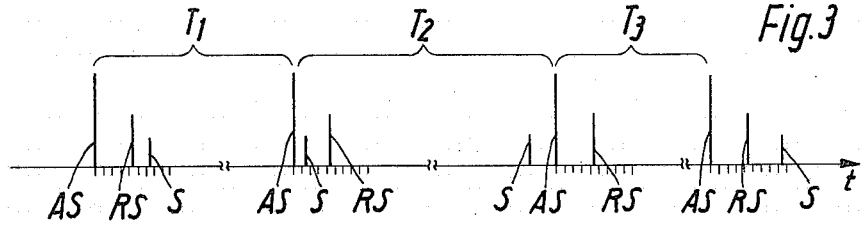
FIG. 3 is a pulse diagram explaining the mode of operation of the apparatus shown in FIG. 2.

When an interference signal S occurs, supplied, for example, for the radar system of automotive vehicle 21 of FIG. 1 from that of automotive vehicle 24, the corresponding AND gate 301 also is opened or switches through, but it will be shown, with reference to FIG. 3, that these interference signals are not taken into account in the indication. Since, for example, an interrogation pulse is emitted approximately every millisecond, but with a statistical variation of, for example, 20 to 30 percent, the distance between the vehicle and the obstacle differs only very slightly during several interrogation pulses. The interrogation signal reflected from the obstacle, in FIG. 1, for example, from the automotive vehicle 22, is gated to the same distance gate during several interrogation signals. This is indicated in FIG. 3 by the division of the abscissa according to the interrogation signal AS. The individual signals, caused thereby at the output of the respective AND gate 301, are totaled on the associated integrating member 306 and sent to the respective signal lamps 305, for example only after the arrival of five such signals, the lamps lighting up only then.

Inteference signal S emitted by vehicle 24, however, is correlated with a different AND gate in the valuation circuit due to the stochastic distribution of the transmission and receiving phases in the radar system of vehicle 21. The resulting output signal of the different AND gate is too weak, however, to light up the associated signal lamps.

For the anticipated ranges of the radar system of about 100 to 150 meters, it is sufficient to provide the proposed number of 15 signal lamps. Generator 304, which clocks counter 303, operates, in this case, for example, with a mean clock frequency of 15 MHz. As it is generally desirable to make the individual distance ranges determined by the AND gates 301 dependent on the vehicle speed, the clock frequency of generator 304 is made dependent on the speed of the automotive vehicle as determined by a tachometer 307, and by circuit means known per se, in order better to represent the danger moment.

The power supply to the individual modules I – III is provided by power supply module IV, in which the voltage taken from an automotive vehicle battery 401, which can either be a 6-volt battery or a 12-volt battery, is stabilized in a voltage stabilizer 402 and then transformed into an AC voltage by means of a network oscillator 403. The AC voltages for the individual modules I, II and III are tapped at the outputs of network oscillator 403, while the DC voltage, required for signal lamps 305, is tapped directly at the output of voltage stabilizer 402, as marked, in FIG. 2, by the circled number 305 adjacent power supply module IV.

Figure 5:
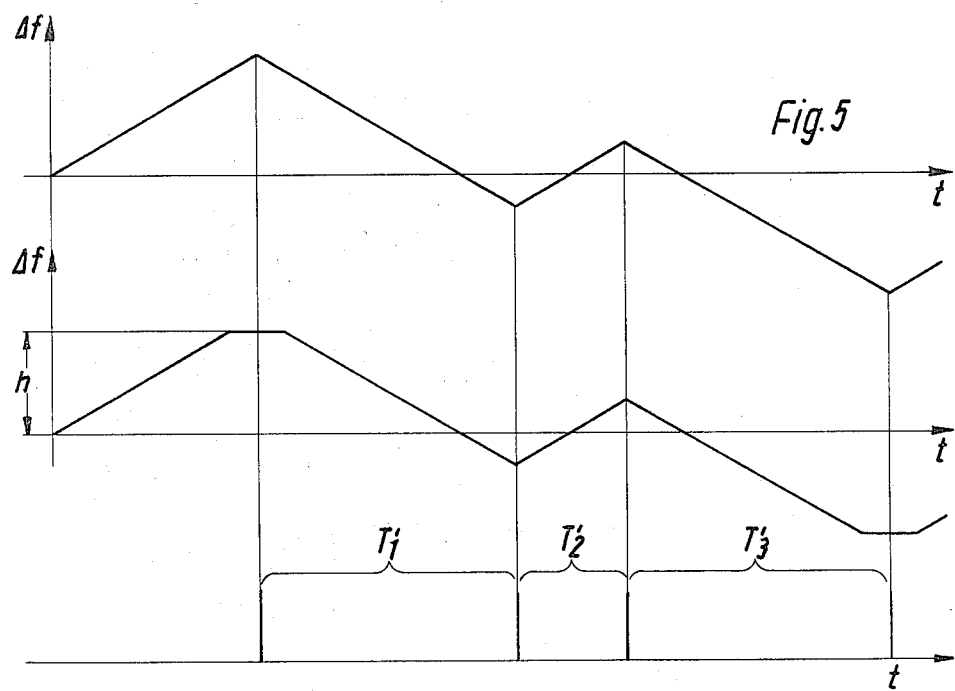
FIG. 5 is a diagram illustrating the frequency modulation of the apparatus shown in FIG. 4.
Figure 4:
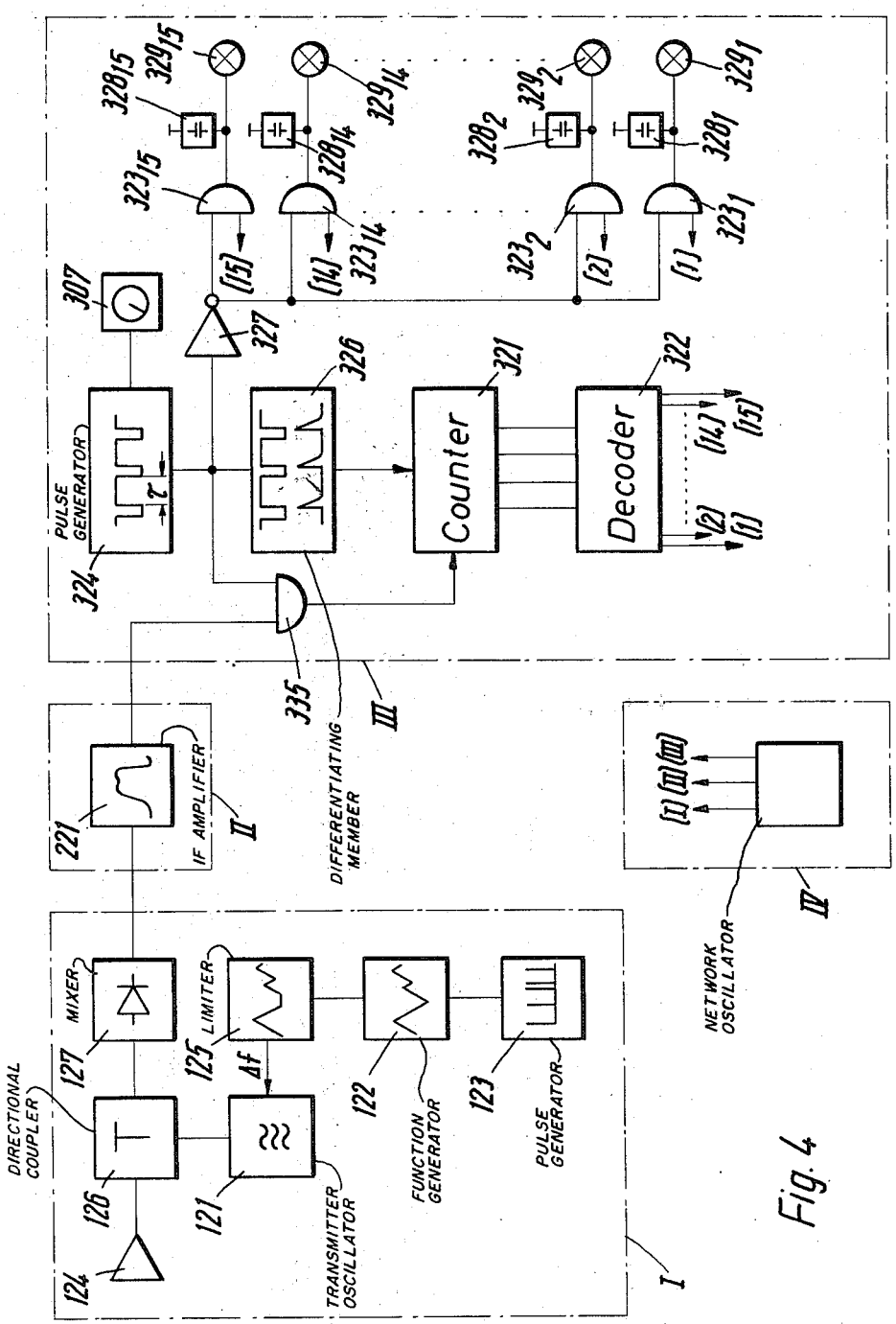
FIG. 4 is a block diagram of another embodiment of apparatus in accordance with the invention.

FIG. 4 illustrates an embodiment of the invention which operates with a frequency-modulated radar system, and also comprises the above-mentioned four modules I, II, III and IV. Transmitter diode 121, which again oscillates in the K band, for example, has its frequency modulated by a function generator 122, particularly in the form of a triangle, for simpler evaluation of the interrogation signals. The frequency variation of the modulation is here selected to be so great that the Doppler frequency shift can be neglected. Pulses by which the frequency deviation of the modulation is determined are supplied to function generator 122 from stochastic generator 123. In this connection, note FIGS. 5a and 5c. Transmitter diode 121 delivers the thus modulated interrogation signals through antenna 124. Between function generator 122 and transmitter diode 121, a limiter 125, for the frequency rise of the modulation, may be inserted, in order thus to limit the band width of the receiver and of the transmitter. In such a case, the interrogation signal transmitted from antenna 124 has a shape as indicated in FIG. 5b. The reversal points of the triangular signal are again approximately within the limits of 20 to 30 percent relative to a triangular signal running to the rise limit $h$ only. The interval $T'$ between two reversal points is to be compared with that marked $T$ in the first embodiment shown in FIGS. 2 and 3, where the pulsed interrogation signals are likewise distributed stochastically about a mean value.

For receiving, a directional coupler 126, which couples a portion of the emitter signal and the received signal into a mixer 127, is inserted between antenna 124 and transmitter oscillator 121. The output signal of mixer 127, that is, the difference frequency proportional to the distance from the obstacle, is amplified in the IF amplifier 221 and then serves to clock a counter 321. Through decoder 322, as described above, clock pulses are again supplied to the first inputs of the AND gates $323_1 - 323_{15}$. However, counter 321 is enabled by a pulse generator 324 having a constant time base $\tau$, through a gate circuit 335, only at intervals determined by the time base, and is reset, at the beginning of the interval, by a pulse which is obtained from the generator pulse through a differentiating member 326.

As a reference signal, there serves the generator signal, which is supplied to an inverter 327 and thereafter to all the further inputs of the AND gates 323 jointly. The outputs of these AND gates are again connected to respective integrating members $328_1$ to $328_{15}$, and thence to respective signal lamps $329_1 - 329_{15}$, which serve the purpose already mentioned in connection with the embodiment shown in FIG. 2.

Depending on the magnitude of the difference frequency proportional to the distance between vehicle and obstacle, counter 321 will now supply a clock pulse to more or less AND gates during the time base. After the end of the time base, the reference pulse is supplied by inverter 327, so that that AND gate which thus just then receives a clock pulse is switched through or opened.

In the embodiment of FIG. 4, there is also no possibility of interference. The same reasoning applies as in the embodiment of FIG. 2, except that the stochastic time span T of FIGS. 2 and 3 must be replaced by the likewise stochastic interval $T'$ between two reversal points of the triangular signal of the modulation.

In order to vary, in the embodiment of FIG. 4, the distance ranges between the automotive vehicle and the obstacle in accordance with the speed of the vehicle, the time base of pulse generator 324 is varied accordingly, by known circuit means, controlled by tachometer 307, but not illustrated.

It is of course possible, with the indicating instrument, to use accoustic warning signals in addition to the signal lamps, signalling a very short distance from an obstacle.

For the apparatus of the invention for measuring and indicating the distance or distance variation between an automotive vehicle and an obstacle, in accordance with the invention, only known components of small dimensions have been used, and these are linked in simple circuitry. It is thus possible to construct the device easily and inexpensively.

Since the measurement and indication of the distance or of the distance variation cannot be falsified by received interference signals, a reliable operation of the device can be expected.

Figure 6:
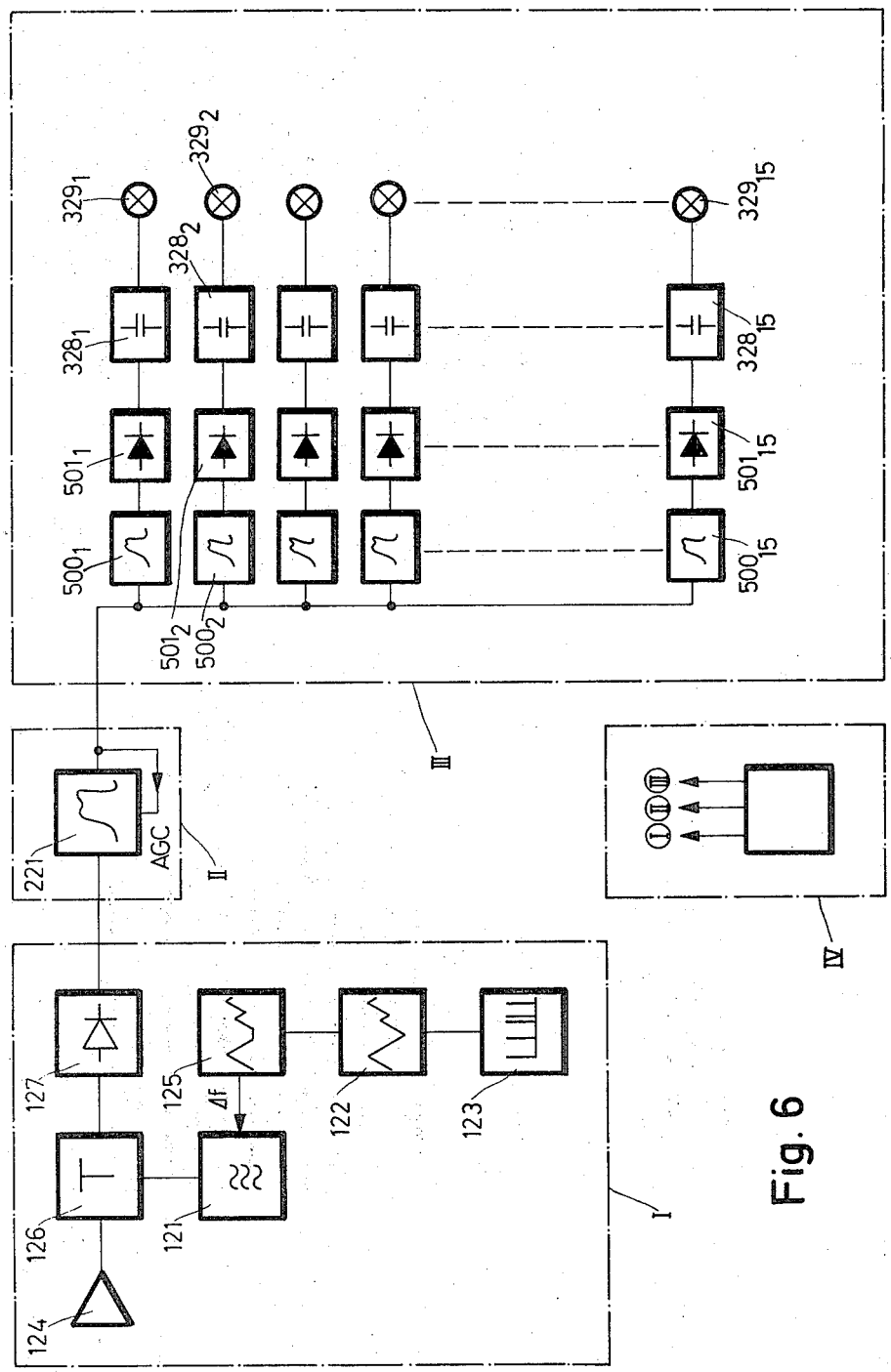
FIGS. 6 and 7 show diagrams of embodiments of apparatus, using frequency modulation and filter chain demodulation.
Figure 7:
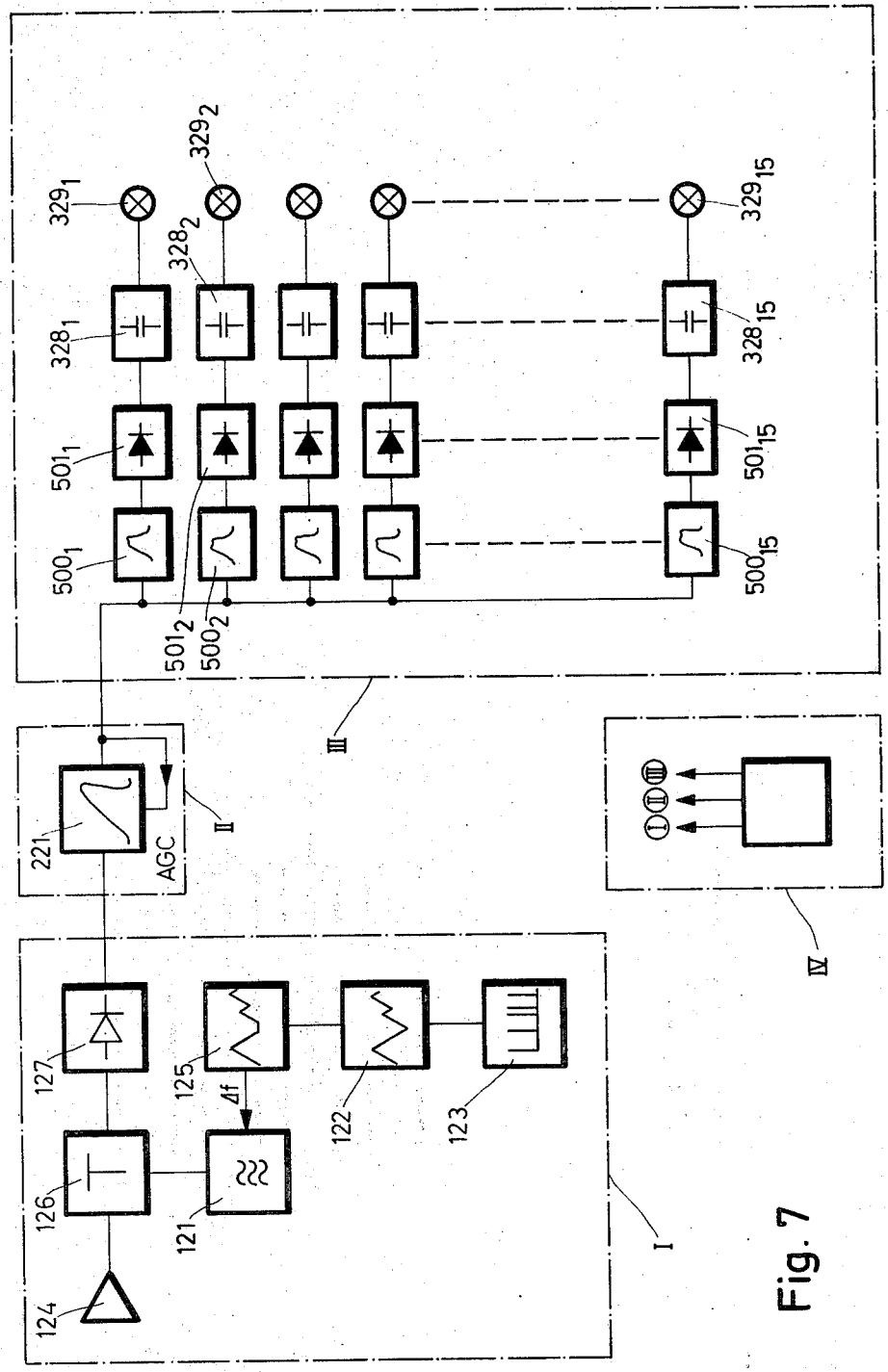

Further embodiments of the invention using frequency-modulated radar systems are illustrated in FIGS. 6 and 7. The rf-module I and the power supply IV of these embodiments are identical to that of FIG. 4 and described above, therefore like or identical parts or components are marked with the same numbers.

In the embodiment of FIG. 6, the if-signal is amplified in an automatic gain controlled amplifier 221 and is routed to a certain number of filters $500_1 - 500_{15}$. The frequency response of each filter is respective to a specific distance range, so that the interesting distance range or frequency range is covered by means of slightly overlapping filter curves. To detect close obstacles more precisely, corresponding to the actual moments of danger, the frequency range can be divided into narrower parts at lower frequencies and wider parts at higher frequencies. The output signals of these filters $500_1 - 500_{15}$ are demodulated by rectifiers $501_1 - 501_{15}$ and freed from interference signals, present only in a short period, by means of integrating members $328_1 - 328_{15}$.

FIG. 7 shows the same embodiment as shown in FIG. 6, but the frequency response of the if-amplifier is carried out to equalize reflected signal levels depending on distance to the obstacle, so that signals of far obstacles have high amplification and signals of close obstacles have low amplification.

While specific embodiments of the invention have been shown and described in detail to illustrate the application of the principles of the invention, it will be understood that the invention may be embodied otherwise without departing from such principles.

What is claimed is:

1. In apparatus for measuring and indicating the distance, distance variation, or both between an automotive vehicle and an obstacle, of the type having a transmitter emitting a modulated interrogation signal, a receiver for the interrogation signal reflected from the obstacle, an evaluating circuit for comparing the received interrogation signal with a reference signal, and an indicating instrument influenced by the evaluating circuit and indicating the desired distance information: the improvement comprising, in combination, a transmitting oscillator included in said transmitter; a generator connected to said oscillator and stochastically controlling a parameter of said oscillator within predetermined limits; a plurality of distance gates, corresponding to respective successive distance areas, in said evaluating circuit; means connecting said evaluating circuit to said receiver; means applying a reference signal to a first input of each distance gate; means applying the received signals to second inputs of the distance gates; and respective correlating means connected to the output of each distance gate and to said indicating instrument and transmitting output signals of the associated distance gate to said indicating instrument only after repeated reception of output signals from the associated distance gates.

2. The improved apparatus, as claimed in claim 1, in which said generator stochastically controls the frequency of said oscillator.

3. The improved apparatus, as claimed in claim 1, in which said generator stochastically controls the amplitude of said oscillator.

4. The improved apparatus, as claimed in claim 1, including a function generator connected to said first-mentioned generator and to said oscillator; said first-mentioned generator stochastically controlling a parameter of said function generator, within predetermined limits, and said function generator controlling a parameter of said oscillator.

5. The improved apparatus, as claimed in claim 4, in which said first-mentioned generator is a pulse generator; said function generator being an electronic switch connected to said pulse generator and to said oscillator, and controlled by said pulse generator to provide a pulse frequency varying stochastically within predetermined limits; said electronic switch pulse-modulating said transmitter oscillator; a counter connected to said first inputs of said distance gates and to said pulse generator, said counter being clock controlled at a constant frequency; said pulse generator starting, with each pulse, said counter and said counter supplying clock pulses successively to the first inputs of said distance gates; said correlating means comprising respective integrator members each connected to the output of a respective distance gate and each having a respective time constant corresponding to a time span between several emitted interrogation signals.

6. The improved apparatus, as claimed in claim 5, including means controlling the frequency of said counter as a function of the speed of the automotive vehicle.

7. The improved apparatus, as claimed in claim 4, in which said function generator controls the frequency of said transmitter oscillator to modulate the frequency as a function which steadily changes in amplitude with a frequency variation which is high relative to the Doppler frequency shift; said first-mentioned generator stochastically controlling the reversal points of said function; a mixer in said receiver determining the difference frequency between emitted and received signals; a digital counter connected to said mixer and clocked by said mixer; means connecting respective outputs of said counter to the first inputs of respective AND gates constituting said distance gates; a pulse generator having a constant time base connected to said counter and clearing said counter at predetermined intervals, said pulse generator, after the expiration of each interval, supplying reference signals to all further inputs of said AND gates; said correlator means comprising respective integrating members each connected to the output of a respective AND gate and having time constants comprising several times the constant time base of said pulse generator.

8. The improved apparatus, as claimed in claim 7, including means controlling the time base of said pulse generator as a function of the speed of the automotive vehicle.

9. The improved apparatus, as claimed in claim 7, in which said function is in the form of triangular pulses.

10. The improved apparatus, as claimed in claim 7, in which said function is in the form of trapezoidal pulses.

11. The improved apparatus, as claimed in claim 7, in which said function is in the form of sawtooth pulses.

12. In apparatus for measuring and indicating the distance, distance variation or both between an automotive vehicle and an obstacle, of the type having a transmitter whose frequency is controlled by a function generator modulating the frequency of the transmitter with a function which steadily varies in amplitude, such as a sawtooth, triangular, or trapezoidal function, and having a high frequency change with respect to the Doppler frequency drift, the period of the chosen modulation being controlled by a stochastical generator, and of the type having an antenna over which the high frequency signals of the transmitter are radiated and are received, after reflection by an obstacle, by an antenna, and of the type further including a mixer determinng the difference frequency between the transmitted and the received signals, an amplifier for amplifying the difference signal and a plurality of filters, of different respective frequency ranges, connected in parallel to the output of the amplifier and connected with respective different indicating lamps for different distance ranges: the improvement comprising said amplifier having an automatic gain control operable to amplify all the signals to the same amplitude; those filters associated with a small distance between the vehicle and the obstacle having a narrower frequency range than those filters associated with a large distance between the vehicle and the obstacle.

* * * * *